United States Patent Office 2,704,748
Patented Mar. 22, 1955

2,704,748

SILICONE RUBBERS WITH IMPROVED COMPRESSION SET

Charles W. Pfeifer, Troy, N. Y., assignor to General Electric Company, a corporation of New York No Drawing. Application April 3, 1952,
Serial No. 280,368

17 Claims. (Cl. 260—37)

This invention relates to modified silicone compositions. More particularly, the invention is concerned with compositions of matter comprising (1) an organopolysiloxane convertible, e. g., by heat, to the solid, elastic state, and (2) from 0.1 to 6 percent, by weight, based on the weight of the organopolysiloxane of a hydroperoxide selected from the class consisting of cumene hydroperoxide (isopropylbenzene hydroperoxide) having the formula

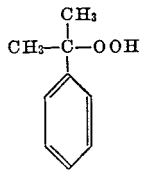

and p-tertiarybutylisopropylbenzene hydroperoxide having the formula

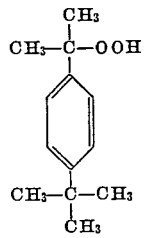

the cured articles derived from said mixture of ingredients having improved compression set at elevated temperatures over the same cured compositions in which the aforesaid hydroperoxides are omitted.

One of the objects of this invention is to improve the compression set of silicone rubbers.

Another object of the invention is to permit the manufacture of silicone rubber gaskets which can be employed at elevated temperatures without undue permanent set at these temperatures.

A still further object of the invention is to obtain silicone rubbers of low compression set using as additives for that purpose compositions requiring reduced processing precautions.

Silicone rubbers in the cured substantially infusible and insoluble state have found eminent use in many applications where continued exposure to elevated temperatures without undue deterioration is a requirement. It has been found that although silicone rubber can resist high temperatures for long periods of time, nevertheless if the silicone rubber is maintained in a compressed state at these elevated temperatures, it becomes permanently deformed when the pressure is released. Although the recovery is partial, in many applications, particularly in gasketing applications, it is highly desirable that this permanent deformation be reduced to a minimum in order to obtain the best sealing effects.

U. S. Patent 2,448,530 issued September 7, 1948, and assigned to the same assignee as the present invention, discloses the use of mercury, oxides of mercury and salts of mercury as additives for incorporation in the silicone rubber prior to vulcanization thereof for the purpose of improving the compression set of the cured or vulcanized silicone rubber. Although the mercury and the mercury compounds are quite effective in improving the compression set, because of the chemical nature of such compositions, extreme care must be taken in using these materials because of the possible toxic effects.

I have discovered that unexpectedly a new class of materials are also effective in improving the compression set of the vulcanized silicone rubber and that these additives which are used for this purpose do not require any particular care or precaution since they have scarcely any handling toxicity and can be used with minimum precautions. The materials which I have found eminently suitable for improving the compression set are two hydroperoxides, namely, isopropylbenzene hydroperoxide and p-tertiarybutylisopropylbenzene hydroperoxide.

The amounts of these additives which I may employ in the practice of the invention may be varied depending on such conditions as the type of vulcanizable organopolysiloxane employed, the kind of filler used in making the silicone rubber, the specific additive employed, the application for which the vulcanized silicone rubber is intended, etc. Generally, I may employ on a weight basis, based on the weight of the convertible organopolysiloxane, from 0.1 to 6 percent, by weight, of the aforesaid hydroperoxide, preferably from about 0.5 to 6 percent.

The convertible silicone compositions which may be highly viscous masses or gummy, elastic solids, depending on the state of condensation, the condensing agent employed, the starting organopolysiloxane used to make the convertible organopolysiloxane, etc., will hereinafter be referred to as "convertible organopolysiloxane" or, more specifically, as "convertible methylpolysiloxane." Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed and claimed in Agens Patent 2,448,756 issued September 7, 1948, or Sprung et al. Patent 2,448,556 issued September 7, 1948, Sprung Patent 2,484,595 issued October 11, 1949, Krieble et al. Patent 2,457,688 issued December 28, 1948, Hyde Patent 2,490,357 issued December 6, 1949, Marsden Patent 2,521,528 issued September 5, 1950, and Warrick Patent 2,541,137 issued February 13, 1951.

It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc., radicals) connected to silicon atoms by carbon-silicon linkages, may be employed without departing from the scope of the invention.

The particular convertible organopolysiloxane used is not critical and may be any one of those described in the foregoing patents which are generally obtained by condensation of a liquid organopolysiloxane containing an average of from about 1.95, preferably from about 1.98, to about 2.05 organic groups per silicon atom. The usual condensing agents which may be employed and which are well known in the art may include, for instance, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, 2 mol percent copolymerized monoorganosiloxane, for example, copolymerized monomethylsiloxane. Generally, I prefer to use as the starting liquid organopolysiloxane from which the convertible, for example, heat-convertible organopolysiloxane is prepared, one which contains about 1.999 to 2.01, inclusive, organic groups, for example, methyl groups, per silicon atom and where more than about 90 percent, preferably 95 percent, of the silicon atoms in the polysiloxane contain two silicon-bonded alkyl groups.

The starting organopolysiloxanes used to make the convertible organopolysiloxanes by condensation thereof preferably comprise organic substituents consisting essentially of monovalent organic radicals attached to silicon through carbon-silicon linkages, there being on the average between 1.95 and 2.25 organic radicals per silicon atom, and in which the siloxane units consist of units of the structural formula R₂SiO where R is preferably a radical of the group consisting of methyl and phenyl radicals. At least 90 percent of the total number of R groups are preferably methyl radicals. The polysiloxane may be one in which all of the siloxane units are (CH₃)₂SiO or the siloxane may be a copolymer of dimethylsiloxane and a minor amount (e. g., from 1 to 20 mol percent) of any of the following units alone or in combination therewith:

$$C_6H_5(CH_3)SiO \text{ and } (C_6H_5)_2SiO$$

A small amount of a cure accelerator, for instance, benzoyl peroxide, tertiary butyl perbenzoate, zirconyl nitrate, etc., may be incorporated into the convertible organopolysiloxane for the purpose of accelerating its cure as is more particularly described in various patents calling for the use of these materials as cure accelerators for silicone rubber. The cure accelerator functions to yield cured products having better properties, for instance, improved elasticity, tensile strength, and tear resistance than is obtained by curing a similar gum composition or convertible organopolysiloxane containing no cure accelerator. The amount of cure accelerator which may be used may be varied, for example, from about 0.1 to about 8 or more percent, preferably from about 1 to 4 percent, by weight, based on the weight of the convertible organopolysiloxane.

The convertible organopolysiloxane may be compounded with various fillers on ordinary rubber compounding rolls, for example, silica, silica aerogel, titanium dioxide, calcium silicate, ferric oxide, chromic oxide, cadmium sulfide, asbestos, glass fibers, calcium carbonate, carbon black, lithopone, talc, etc., and molded, extruded, cast or otherwise shaped as by heating under pressure to form products having physical characteristics, e. g., elasticity, compressibility, etc., similar to those of natural rubber and other known synthetic rubbers.

The elastomers comprising the cured organopolysiloxanes of the present invention are particularly characterized by their improved compression set characteristics and greater thermal stability as compared with silicone rubbers similarly made but having none of the hydroperoxides described above incorporated therein. Other properties, for instance, hardness, tensile strength, and elongation, are much the same as those of the cured gum composition from which the specific hydroperoxides mentioned above are omitted.

In order that those skilled in the art may better understand how the present invention may be practiced, the following examples are given by way of illustration and not by way of limitation. All parts are by weight. Where para-tertiary butyl isopropyl benzene hydroperoxide is employed in the following examples, it was in the form of a 50 percent, by weight, solution in para-tertiary butyl isopropyl benzene.

EXAMPLE 1

A highly viscous convertible organopolysiloxane, specifically a dimethylsiloxane, substantially non-flowable at room temperature was prepared by condensing at a temperature of about 150° C. for about six hours octamethylcyclotetrasiloxane with about 0.01 percent, by weight, thereof potassium hydroxide. This polymer was soluble in benzene and had slight flow at room temperature. This convertible polymeric dimethylsiloxane, which for brevity will be referred to hereinafter as "polydimethylsiloxane," was then mixed on rubber compounding differential rolls with varying amounts of silica aerogel, diatomaceous earth, benzoyl peroxide, and isopropylbenzene hydroperoxide. A control was also prepared in which the isopropylbenzene hydroperoxide was omitted.

The mixtures thus obtained were molded in a closed mold in the form of flat sheets (from which test specimens could be cut) at about 130° C. for about 15 minutes at a pressure of approximately 500 p. s. i. Thereafter, the samples were removed from the press and further heat-treated at a temperature of about 250° C. for about 24 hours in an air circulating oven to insure essentially complete cure of the silicone rubber. The formulations employed in making the various samples as well as the properties of the cured materials, namely, tensile strength, percent elongation, and percent compression set, are disclosed in the following Table I.

The compression set characteristics which are given in Table I and elsewhere herein as percent compression set were determined by a modification of ASTM D-395-49T.

For the compression set test, discs were cut from the molded and heat-treated sheets described above. These discs were superposed upon one another until a cylinder ½ inch high was obtained. This cylinder, which for brevity will hereinafter be referred to as a "plug," was compressed to 70 percent of its original thickness between steel plates and was then heated while under this compression at 150° C. for 22 hours, and then was cooled to room temperature. The pressure was released and the thickness of the resulting plug measured 30 minutes thereafter. The figures given in Table I show the compression set of the plugs as a result of the treatment. A 100 percent compression set would indicate no recovery, while a zero compression set would mean that the plug had returned to its original thickness after release of the pressure.

Table I

|  | Sample Number | | | |
| --- | --- | --- | --- | --- |
|  | 1 | 2 | 3 | 4 |
| Ingredients—Parts: | | | | |
| Polydimethylsiloxane | 100 | 100 | 100 | 100 |
| Silica aerogel (Santocel C) | 20 | 20 | 20 | 20 |
| Diatomaceous earth | 100 | 100 | 100 | 100 |
| Benzoyl Peroxide | 2 | 2 | 2 | 2 |
| Isopropylbenzene hydroperoxide | 0 | 2 | 3 | 4 |
| Properties: | | | | |
| Shore "A" Hardness | 65 | 60 | 55 | 60 |
| Tensile, p. s. i. | 855 | 569 | 447 | 406 |
| Percent Elongation | 125 | 140 | 130 | 140 |
| Percent Compression Set | 91 | 28 | 30 | 37 |

EXAMPLE 2

In this example, the same polydimethylsiloxane employed in Example 1 was compounded with silica aerogel (Santocel C manufactured by Monsanto Chemical Company), benzoyl, peroxide, and p-tertiarybutylisopropylbenzene hydroperoxide. Sheets were molded in the same manner as described in Example 1 above, and further cured in an oven for 24 hours at 250° C. Thereafter, the plugs made from the above-described sheets were subjected to the compression set tests described previously (i. e., 22 hours at 150° C.) and the various samples tested for hardness, percent compression set, tensile, elongation, and tear strength. The following Table II shows the formulations employed as well as the results of the physical tests conducted on the various samples. For comparison, samples were also prepared in which the usual cure accelerator, namely, benzoyl peroxide, was omitted to show that the hydroperoxide compound effected scarcely any cure of the mold products when subjected to the same molding cycle as the samples containing benzoyl peroxide as the cure accelerator.

Table II

|  | Sample Numbers | | | | | |
| --- | --- | --- | --- | --- | --- | --- |
|  | 5 | 6 | 7 | 8 | 9 | 10 |
| Ingredients—Parts: | | | | | | |
| Polydimethylsiloxane | 100 | 100 | 100 | 100 | 100 | 100 |
| Silica Aerogel | 45 | 45 | 45 | 45 | 45 | 45 |
| Benzoyl peroxide | 1.65 | 1.65 | 0 | 0 | 0 | 0 |
| p-tertiarybutylisopropylbenzene hydroperoxide | 0 | 0.75 | 0.5 | 0.75 | 1.0 | 1.25 |
| Properties: | | | | | | |
| Shore "A" Hardness | 50 | 42 | 40 | 39 | 36 | 35 |
| Tensile, p. s. i. | 865 | 610 | 70 | 75 | 70 | 80 |
| Percent Elongation | 270 | 250 | 130 | 50 | 50 | 130 |
| Percent Compression Set | 50.5 | 21.0 | 57.6 | 47.4 | 45.9 | 45.1 |
| Tear Strength, p. s. i. | 61.5 | 43.3 | 3.0 | 0 | 0 | 0 |

The foregoing results in Table II clearly show that the p-tertiarybutylisopropylbenzene hydroperoxide is not a cure accelerator for the silicone rubber in the same manner as is the benzoyl peroxide, but rather acts solely in the capacity of reducing the percent compression set of the converted, i. e., cured, silicone elastomer.

It should be noted in the foregoing example and in the examples which follow that in each case a control was conducted in which the compression set additive was omitted because of the fact that the convertible polydimethylsiloxane used in each example was obtained from a different manufacturing batch. Since the heat-convertible organopolysiloxanes differ from batch to batch in properties and although these differences are not marked, nevertheless, for proper comparison it was deemed desirable to have a separate control each time. The variation in the properties of the heat-convertible organopolysiloxane will also be evident in the following examples in which essentially the same amounts of additive were used but different heat-convertible organopolysiloxanes having different origins were used. This also explains the difference in results as far as percent compression set is concerned using the additives. However, it is to be noted that in each case where the additive was incorporated, a marked improvement in the compression set properties of the heat-converted product was realized.

EXAMPLE 3

In this example a heat-convertible dimethylsiloxane was prepared by condensing a dimethyl silicone oil containing 0.4 mol percent intercondensed monomethylsiloxane (obtained by hydrolyzing dimethyldichlorosilane containing 0.4 mol percent methyltrichlorosilane) by heating the aforesaid silicone oil with about 0.01 percent, by weight, thereof KOH in the same manner as that employed for making the heat-convertible polydimethylsiloxane described in Example 1. This highly viscous substantially non-flowable material was then compounded on rubber compounding rolls in the same manner as was done in Example 1 with diatomaceous earth, benzoyl peroxide, and varying amounts of p-tertiarybutylisopropylbenzene hydroperoxide. Sheets were molded similarly as was done in Example 1 and thereafter further heated in an oven for 24 hours at 250° C. Thereafter, the sheets were tested for hardness, tensile, and elongation, while the plugs were subjected to a compression set test similar to that described in Example 1 except that the heating at 150° C. was for 70 hours. Table III shows the formulations employed as well as the results of the physical tests conducted.

Table III

| | Sample Number | | | | |
|---|---|---|---|---|---|
| | 11 | 12 | 13 | 14 | 15 |
| Ingredients—Parts: | | | | | |
| Polydimethylsiloxane | 100 | 100 | 100 | 100 | 100 |
| Diatomaceous earth | 150 | 150 | 150 | 150 | 150 |
| Benzoyl peroxide | 1.5 | 1.5 | 1.5 | 1.5 | 1.5 |
| p-tertiarybutylisopropylbenzene hydroperoxide | 0 | 0.25 | 0.5 | 0.75 | 1.0 |
| Properties: | | | | | |
| Shore "A" Hardness | 71 | 71 | 71 | 71 | 70 |
| Percent Compression Set | 84.3 | 67.8 | 58.5 | 32.6 | 26.1 |
| Tensile, p. s. i | 770 | 780 | 795 | 765 | 730 |
| Percent Elongation | 90 | 80 | 90 | 90 | 100 |

EXAMPLE 4

The polydimethylsiloxane described in Example 3 was mixed with diatomaceous earth, benzoyl peroxide and p-tertiarybutylisopropylbenzene hydroperoxide on rubber differential rolls in varying proportions. Sheets were molded similarly as described in the previous examples, heat-aged for 24 hours at 250° C. and thereafter tested for various physical properties including percent compression set, the latter test for compression set being carried out for 22 hours at 150° C. instead of for 70 hours at 150° C. as pointed out in Example 3. The formulations employed as well as the results of the physical tests are described below in Table IV.

Table IV

| | Sample Number | | | | | |
|---|---|---|---|---|---|---|
| | 16 | 17 | 18 | 19 | 20 | 21 |
| Ingredients—Parts: | | | | | | |
| Polydimethylsiloxane | 100 | 100 | 100 | 100 | 100 | 100 |
| Diatomaceous earth | 150 | 150 | 150 | 150 | 150 | 150 |
| Benzoyl peroxide | 1.5 | 1.5 | 1.5 | 1.5 | 1.5 | 1.5 |
| p-Tertiarybutylisopropylbenzene hydroperoxide | 0 | 0.25 | 0.5 | 0.75 | 1.0 | 1.25 |
| Properties: | | | | | | |
| Shore "A" Hardness | 72 | 73 | 73 | 70 | 68 | 68 |
| Percent Compression Set, 22 hours/150° C | 60.9 | 46.0 | 34.5 | 27.3 | 16.5 | 11.0 |
| Tensile, p. s. i | 580 | 570 | 555 | 560 | 525 | 510 |
| Percent Elongation | 90 | 80 | 90 | 90 | 90 | 90 |

EXAMPLE 5

This example is intended to describe the effect of using increased amounts of p-tertiarybutylisopropylbenzene hydroperoxide. More particularly, the polydimethylsiloxane described in Examples 3 and 4 and employed in the foregoing examples was mixed again with diatomaceous earth, benzoylperoxide, and p-tertiarybutylisopropylbenzene hydroperoxide on rubber differential rolls, molded into sheets using the same cure cycle and heat-aging described in Example 4, and thereafter tested for various physical properties including compression set which was conducted while the plug was under compression for 22 hours at 150° C. Table V shows the results of the physical tests conducted on the various samples.

Table V

| | Sample Number | | | | | |
|---|---|---|---|---|---|---|
| | 22 | 23 | 24 | 25 | 26 | 27 |
| Ingredients—Parts: | | | | | | |
| Polydimethylsiloxane | 100 | 100 | 100 | 100 | 100 | 100 |
| Diatomaceous earth | 150 | 150 | 150 | 150 | 150 | 150 |
| Benzoyl peroxide | 1.5 | 1.5 | 1.5 | 1.5 | 1.5 | 1.5 |
| p-Tertiarybutylisopropylbenzene hydroperoxide | 1.0 | 1.25 | 1.5 | 1.75 | 2.0 | 2.25 |
| Properties: | | | | | | |
| Shore "A" Hardness | 75 | 73 | 71 | 71 | 71 | 73 |
| Percent Compression Set, 22 hours/150° C | 16.1 | 14.8 | 13.3 | 12.1 | 12.5 | 12.4 |
| Tensile, p. s. i | 690 | 725 | 725 | 605 | 480 | 595 |
| Percent elongation | 90 | 90 | 90 | 60 | 50 | 60 |

EXAMPLE 6

In this example, a heat-convertible organopolysiloxane, specifically a polydimethylsiloxane containing about 0.40 mol percent copolymerized monomethylsiloxane, was prepared by first hydrolyzing dimethyldichlorosilane containing 0.40 mol percent methyltrichlorosilane to an oil and thereafter condensing this material with about 0.1 percent, by weight, thereof partially hydrated ferric chloride until a solid elastic product substantially insoluble in benzene was obtained. A molding composition was prepared from this gum with diatomaceous earth, benzoyl peroxide, and p-tertiarybutylisopropylbenzene hydroperoxide similarly as was done in the previous examples, and the molding compositions thereafter molded and further heat-cured for 24 hours at 250° C. in the form of flat sheets. The molded products were then tested for various physical properties and compression set in which the plug was compressed in this test for 22 hours at 150° C. Table VI shows the various formulations used in making the molding compositions as well as the results of physical tests conducted on the molded heat-treated samples.

Table VI

| | Sample Number | | | | | |
|---|---|---|---|---|---|---|
| | 28 | 29 | 30 | 31 | 32 | 33 |
| Ingredients—Parts: | | | | | | |
| Polydimethylsiloxane | 100 | 100 | 100 | 100 | 100 | 100 |
| Diatomaceous earth | 150 | 150 | 150 | 150 | 150 | 150 |
| Benzoyl peroxide | 1.5 | 1.5 | 1.5 | 1.5 | 1.5 | 1.5 |
| p-Tertiarybutylisopropylbenzene hydroperoxide | 0 | 0.25 | 0.5 | 0.75 | 1.0 | 1.25 |
| Properties: | | | | | | |
| Shore "A" Hardness | 75 | 74 | 72 | 70 | 69 | 65 |
| Percent Compression Set, 22 hrs./150° C | 42.6 | 35.9 | 34.9 | 27.7 | 25.9 | 19.2 |
| Tensile, p. s. i | 800 | 765 | 735 | 675 | 655 | 630 |
| Percent Elongation | 70 | 80 | 90 | 90 | 110 | 100 |

It will, of course, be apparent to those skilled in the art that in addition to the convertible organopolysiloxanes employed in the foregoing examples, other organopolysiloxanes, many examples of which have been given previously, may be used without departing from the scope of the invention. Additionally, other types of vulcanization accelerators or cure accelerators beside the benzoyl peroxide described above may also be employed. Various other fillers may be used and obviously the amount of filler may be varied considerably depending, for example, on the particular filler employed, its particle size, the specific convertible organopolysiloxane used, the purpose for which the finished product is to be used, etc. Thus, filed organopolysiloxanes may be produced containing, for instance, from about 20 to about 150 percent, by weight, filler based on the entire weight of filled material. Generally, the filler on a weight basis may be employed in an amount equal to from about 0.15 to 3 parts of filler per part of convertible organopolysiloxane, for example, heat-convertible polydimethylsiloxane. When one employs, for instance, silica aerogel, as the filler, the amount of such filler which may advantageously be used with the convertible organopolysiloxane is much less than usual fillers especially when the benzene-soluble diorganosiloxanes described above having slight flow at room temperature are used. In such instances, the amount of silica aerogel which may be tolerated in the filled composition is generally below 50 to 60 parts of the silica aerogel filler per 100 parts of the convertible organopolysiloxane.

Obviously, the amount of the hydroperoxides used in the practice of the present invention may also be varied. Generally, I have found that no particular advantage is derived from incorporating amounts of hydroperoxide in excess of 4 to 6 percent. The use of hydroperoxide above this amount may undesirably affect the quality of the silicone rubber.

The products of this invention are useful in such applications, for instance, as gaskets, tubing, electrical insulation (e. g., as conductor insulation, etc.), shock absorbers, etc. They are particularly suitable for use as gaskets in applications involving high temperature compression conditions especially in those places where they may be subjected to the effects of halogenated hydrocarbons as insulating media, namely, in the manufacture of capacitors. Because of their resistance to heat they have value as materials for use in applications where natural or other synthetic rubbers fail owing to the deleterious effect of heat. Elastomers produced by the practice of my invention have the additional property of retaining their flexibility at low temperatures, e. g., at temperatures as low as −60° C.

What I claim as new and desire to secure by Letters Patent of the United States is:

1. A composition of matter comprising (1) an organopolysiloxane convertible to the solid elastic state, the organic groups of the aforesaid organopolysiloxane comprising monovalent hydrocarbon radicals attached to silicon by carbon-silicon linkages, and (2) from 0.1 to 6 percent, by weight, of a hydroperoxide selected from the class consisting of isopropylbenzene hydroperoxide and p-tertiarybutylisopropylbenzene hydroperoxide, the aforesaid weight of the hydroperoxide being based on the weight of the organopolysiloxane.

2. A composition comprising (1) a polydimethylsiloxane convertible to the solid elastic state and (2) from 0.1 to 6 percent, by weight, based on the weight of the polydimethylsiloxane, of a hydroperoxide selected from the class consisting of isopropylbenzene hydroperoxide and p-tertiarybutylisopropylbenzene hydroperoxide.

3. A composition comprising (1) an organopolysiloxane convertible by heat to the solid elastic state, the aforesaid organopolysiloxane comprising essentially a diorganosiloxane of the recurring structural unit RRSiO in which R represents radicals, some of which may be unlike, selected from the class consisting of silicon-bonded monovalent methyl and aryl radicals and in which diorganosiloxane at least 75 percent of the total number of R groups are methyl radicals, and (2) from 0.1 to 6 percent, by weight, based on the weight of the diorganosiloxane of a hydroperoxide selected from the class consisting of isoproplybenzene hydroperoxide and p-tertiarybutylisopropylbenzene hydroperoxide.

4. A composition of matter comprising (1) a methyl polysiloxane convertible by heat to the cured, solid, elastic state and (2) from 0.1 to 6 percent, by weight, based on the weight of the methyl polysiloxane, of isopropylbenzene hydroperoxide.

5. A composition of matter comprising (1) a methyl polysiloxane convertible by heat to the cured, solid, elastic state and (2) from 0.1 to 6 percent, by weight, based on the weight of the methyl polysiloxane, of p-tertiarybutylisopropylbenzene hydroperoxide.

6. A product comprising a cured, solid, elastic organopolysiloxane having incorporated therein prior to curing, from 0.1 to 6 percent, by weight, thereof of an additive for improving the compression set of the aforesaid organopolysiloxane comprising a hydroperoxide selected from the class consisting of isopropylbenzene hydroperoxide and p-tertiarybutylisopropylbenzene hydroperoxide, and a curing agent other than either of the aforesaid hydroperoxides for the organopolysiloxane.

7. An elastomer comprising the heat-cured elastic product of claim 3 in the presence of a curing agent for the organopolysiloxane other than the recited hydroperoxides.

8. A heat-curable elastic composition comprising (1) a methyl polysiloxane convertible by heat to the cured, solid, elastic state, (2) from 0.1 to 6 percent, by weight, of a hydroperoxide selected from the class consisting of isopropylbenzene hydroperoxide and p-tertiarybutylisopropylbenzene hydroperoxide, and (3) from 0.1 to 8 percent, by weight, of a cure accelerator for the aforesaid organopolysiloxane other than the aforesaid hydroperoxides, the weights of (2) and (3) being based on the weight of the methyl polysiloxane.

9. A curable composition of matter comprising (1) an organopolysiloxane convertible by heat to the cured, solid, elastic state, the organic groups of the aforesaid organopolysiloxane comprising monovalent hydrocarbon radicals attached to silicon by carbon-silicon linkages, (2) 0.1 to 6 percent, by weight, of a hydroperoxide selected from the class consisting of isopropylbenzene hydroperoxide and p-tertiarybutylisopropylbenzene hydroperoxide, (3) from 0.1 to 8 percent, by weight, of a cure accelerator for (1) comprising benzoyl peroxide, and (4) a filler, the weights of (2) and (3) being based on the weight of the organopolysiloxane.

10. An elastomer comprising the heat-cured elastic product of claim 9.

11. A curable composition of matter comprising (1) a methyl polysiloxane convertible by heat to the cured, solid, elastic state, (2) from 0.1 to 6 percent, by weight, isopropylbenzene hydroperoxide, (3) from 0.1 to 4 percent, by weight, benzoyl peroxide, and (4) a filler, the weights of (2) and (3) being based on the weight of the methyl polysiloxane.

12. A curable composition of matter comprising (1) a methyl polysiloxane convertible by heat to the cured, solid, elastic state, (2) from 0.1 to 6 percent, by weight, p-tertiarybutylisopropylbenzene hydroperoxide, (3) from 0.1 to 4 percent, by weight, benzoyl peroxide, and (4) a filler, the weights of (2) and (3) being based on the weight of the methyl polysiloxane.

13. A product comprising the cured composition of claim 11.

14. A product comprising the cured composition of claim 12.

15. A product comprising a synthetic elastomer obtained by curing a heat-convertible methyl polysiloxane containing a filler, from 0.1 to 6 percent, by weight, isopropylbenzene hydroperoxide, a cure accelerator comprising benzoyl peroxide in an amount equal to from 0.1 to 4 percent, by weight, and a filler comprising silica aerogel, the weights of the hydroperoxide and the cure accelerator being based on the weight of the methyl polysiloxane.

16. A product comprising a synthetic elastomer obtained by curing a heat-convertible methyl polysiloxane containing a filler, from 0.1 to 6 percent, by weight, p-tertiarybutylisopropylbenzene hydroperoxide, a cure accelerator comprising benzoyl peroxide in an amount equal to from 0.1 to 4 percent, by weight, and a filler comprising silica aerogel, the weights of the hydroperoxide and the cure accelerator being based on the weight of the methyl polysiloxane.

17. The method which comprises (1) incorporating a cure accelerator other than either of the two subsequently mentioned hydroperoxides, and from 0.1 to 8 percent, by weight, of an additive selected from the class consisting of isopropylbenzene hydroperoxide and p-tertiarybutylisopropylbenzene hydroperoxide into a composition comprising an organopolysiloxane convertible by heat to the cured, solid, elastic state, the organic groups of the aforesaid organopolysiloxane comprising monovalent hydrocarbon radicals attached to silicon by carbon-silicon linkages, the said additive capable of improving the compression set of the cured organopolysiloxane, and (2) curing the resulting composition under the influence of heat.

References Cited in the file of this patent

UNITED STATES PATENTS

| | | |
|---|---|---|
| 2,448,530 | Jones | Sept. 7, 1948 |
| 2,460,795 | Warrick | Feb. 1, 1949 |